Patented Mar. 20, 1945

2,371,869

UNITED STATES PATENT OFFICE 2,371,869

METHOD OF PRODUCING POLYMERS

Hans Bergk, Krefeld, Germany; vested in the Alien Property Custodian

No Drawing. Application November 14, 1940, Serial No. 365,645. In Germany June 20, 1939

6 Claims. (Cl. 260—2)

This invention relates to method of producing polymers.

An object of this invention is the production of polymeric products by a novel manner.

A further object of this invention is the production of polymeric products from relatively stable substances.

A more specific object of this invention is to produce a polymeric product from the polymerization of acid amides with di-halides.

Acid amides themselves may be very easily produced in several ways, for example, from diesters and aqueous ammonia, or from acid chloride likewise by reaction with aqueous ammonia. The halides are likewise easily produced in many ways which are known to the art.

In suitable combinations, di-halides of the type X—R—X combine with acid amides of the type $NH_2$—CO—$R^1$—CO—$NH_2$, according to the following reaction:

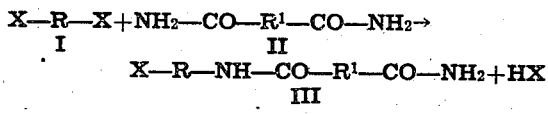

In this equation:
X = Cl, Br, I,
R = aliphatic, aromatic or cyclic residue with straight or branched chains, and
$R^1$ = a bi-valent radical which may be of the type similar to R.

The halogen may either be at the end of the chain, for example, $BrCH_2$—$(CH_2)_4$—$CH_2Br$, or in the middle, for example,

The chain may consist only of carbon atoms but also may contain oxygen, sulphur or nitrogen bridges.

The chains or the side chains can also contain double bonds, for example,

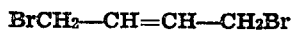

The radical R can contain atoms or atom groups which facilitate the splitting off of the halogen atom.

The product III can either be reacted with itself or with I and II for the formation of a larger molecule chain.

The reaction can be substantially accelerated if a catalyst, for example, alkaline oxide, hydroxide or carbonates, or basic organic substances, aluminum chloride or zinc chloride are added to the reaction mix.

An additional possibility for accelerating the reaction is by the removal of the hydrogen halides which become free during the reaction. Also an acceleration may be effected by a raising of the temperature of the mix as well by changing the pressure. The temperature should be so chosen that no decomposition of the amides will result, since, for example, in the case of adipic acid diamides, this may happen if the mix is heated for a long time even beneath the melting point. It is best for the purposes in mind to exclude all oxidizing substances, so the atmospheric oxygen should be replaced by nitrogen. If it is desired to decelerate the reaction or bring it to a standstill this can be done by the removal of the catalyst in addition to the maintenance of a lower temperature, so that in the case of a supplemental heating which is necessary for a further working of the material, no further polymerization will arise.

A further advantage of the method according to this invention lies in the fact that polymerization can also be stopped by raising the temperature of the mix and at the same time adding materials which are designed to saturate the end groups. Such materials can be combinations of the type I or type II, or materials which react with the end group, such, for example, as amines, acid chlorides and the like.

As specific examples of the method and product formed in accordance with this invention, attention is directed to the following:

Example 1

One molecule of 1,6 dibrom-n-hexane and one molecule of adipic acid diamide are brought into solution or into the finest suspension in 2500 cubic centimeters of benzine by an extremely rigorous agitation. Being careful to exclude water and atmospheric oxygen, one adds 50 grams of the most finely pulverized aluminum chloride together with oxygen-free nitrogen. After then heating at 50° reaction begins, when it is desired to separate the aluminum chloride, the reaction mix can be poured into vigorously agitated water so that a minute separation and complete removal of the aluminum chloride is effected.

Example 2

One molecule of adipic acid diamide and one molecule of dibrom butadiene are heated in an autoclave in the presence of hydrogen at 180° C. until a body of the desired plastic property results. Viscosity can then serve as a measure of this desired plasticity. The hydrogen bromide which will arise can be removed from the reaction mix by proper amount of caustic soda.

The general and specific examples of the method of and product as given above are believed to satisfy the objects primarily stated, but I do not intend to be limited thereto except as may be required by the following claims.

I claim:

1. The method of preparing a polymeric product which comprises the steps of heating adipic acid diamide with a compound of the general formula X—R—X, wherein R is an aliphatic hydrocarbon and X is an element selected from the group consisting of chlorine, bromine and iodine.

2. The method according to claim 1, in which the heating is effected in the presence of a catalyst, for the purpose of accelerating the reaction.

3. The method according to claim 1, which includes the step of removing the hydrogen halide formed during the reaction to accelerate the reaction.

4. The method according to claim 1, in which the heating is effected in the presence of a catalyst for the purpose of accelerating the reaction, and which includes the further step of withdrawing the catalyst from the reaction mix to terminate the chain formation and stabilize the polymerization.

5. The method according to claim 1, which includes the steps of raising the temperature of the mix and substantially simultaneously adding chemicals for saturating the end groups, for the purpose of terminating chain formation and stabilizing the polymerization.

6. The method of preparing a polymeric product which comprises stirring together substantially equimolecular parts of 1,6-dibrom-n-hexane and adipic acid diamide in benzine, adding finely pulverized aluminum chloride and nitrogen and finally removing the residual aluminum chloride by pouring the reaction mixture into vigorously agitated water.

HANS BERGK.